Figure 17:
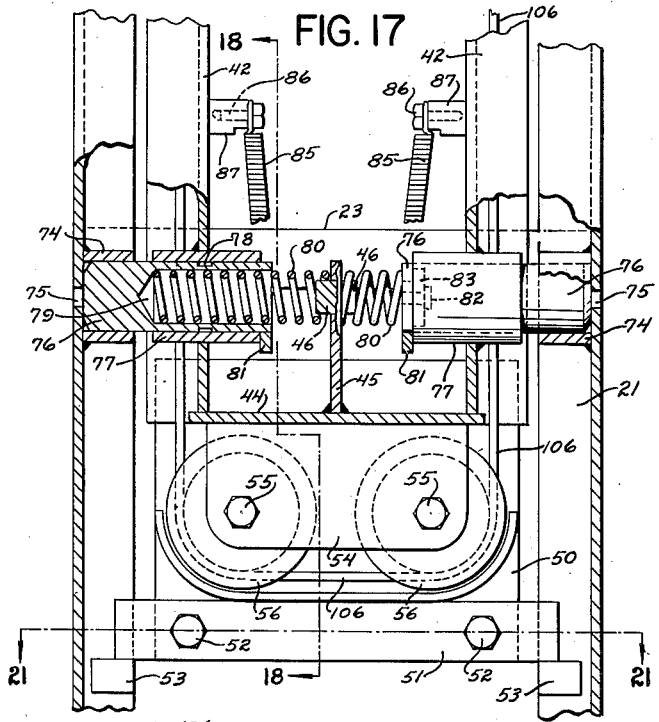

March 11, 1952  G. HEINISH  2,589,080
POWER-OPERATED TELESCOPING MAST AND BRACES
Filed Nov. 5, 1949  9 Sheets-Sheet 1
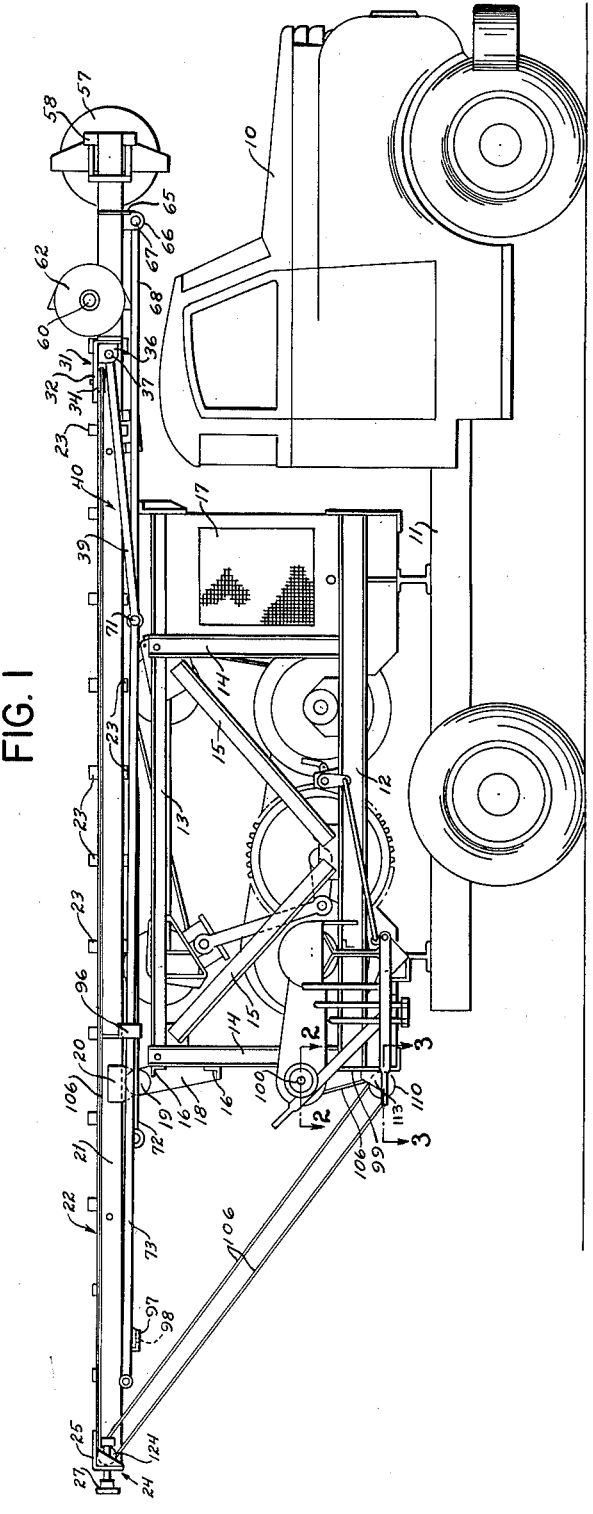
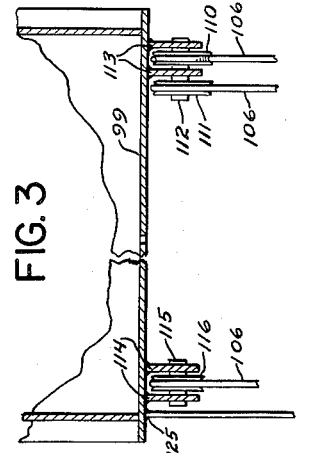
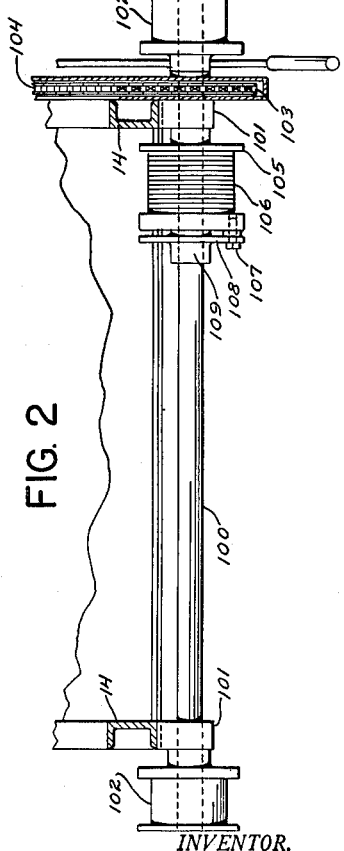
INVENTOR.
GEORGE HEINISH
BY
ATTORNEYS March 11, 1952     G. HEINISH     2,589,080
POWER-OPERATED TELESCOPING MAST AND BRACES
Filed Nov. 5, 1949     9 Sheets-Sheet 2
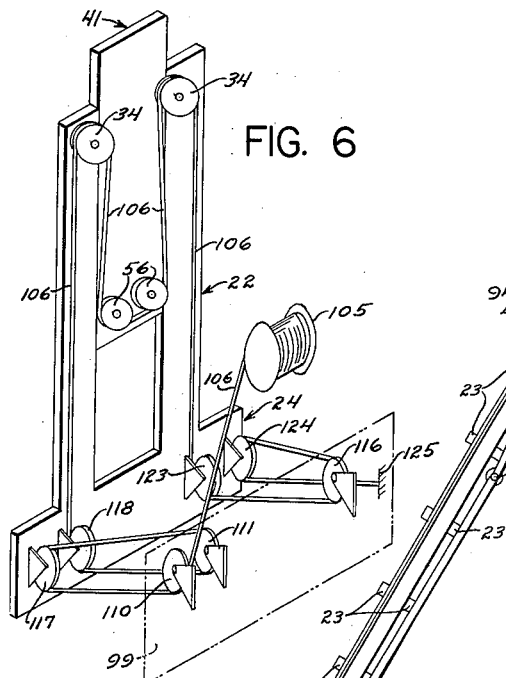
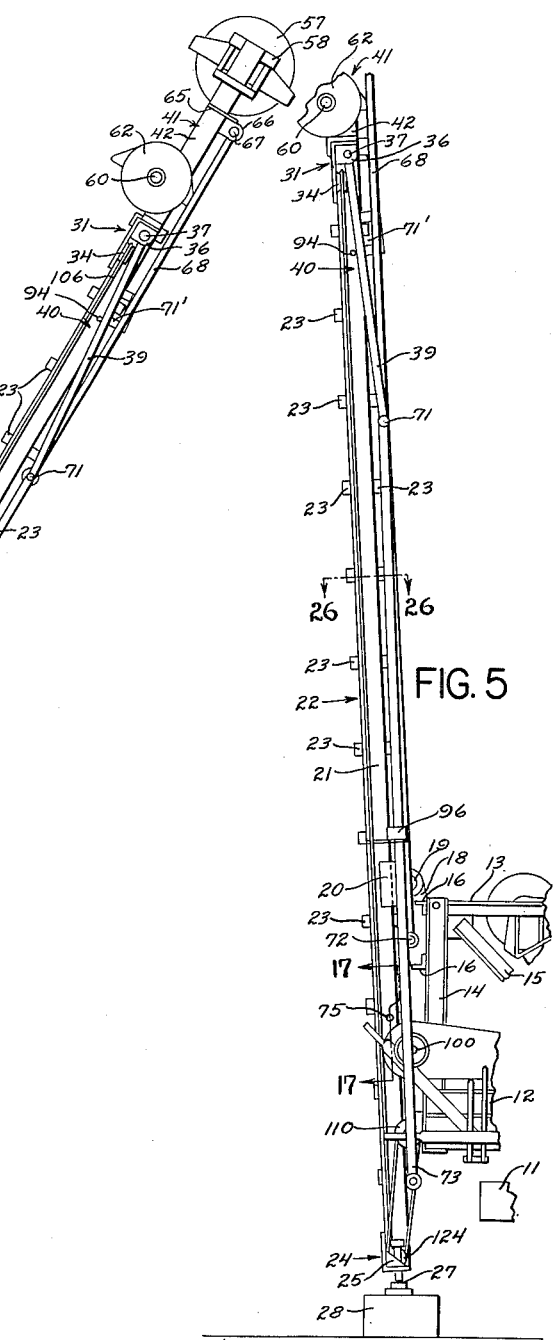
INVENTOR.
GEORGE HEINISH
BY
ATTORNEYS March 11, 1952  G. HEINISH  2,589,080
POWER-OPERATED TELESCOPING MAST AND BRACES
Filed Nov. 5, 1949  9 Sheets-Sheet 3
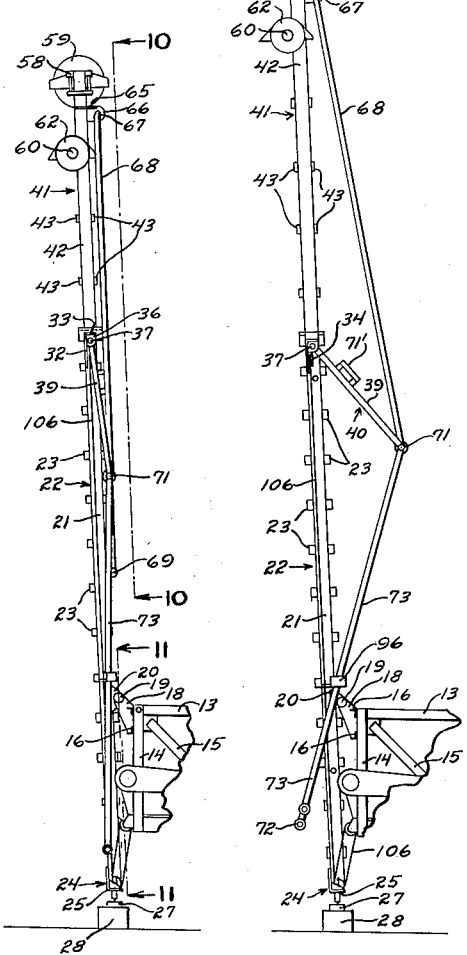
FIG. 7
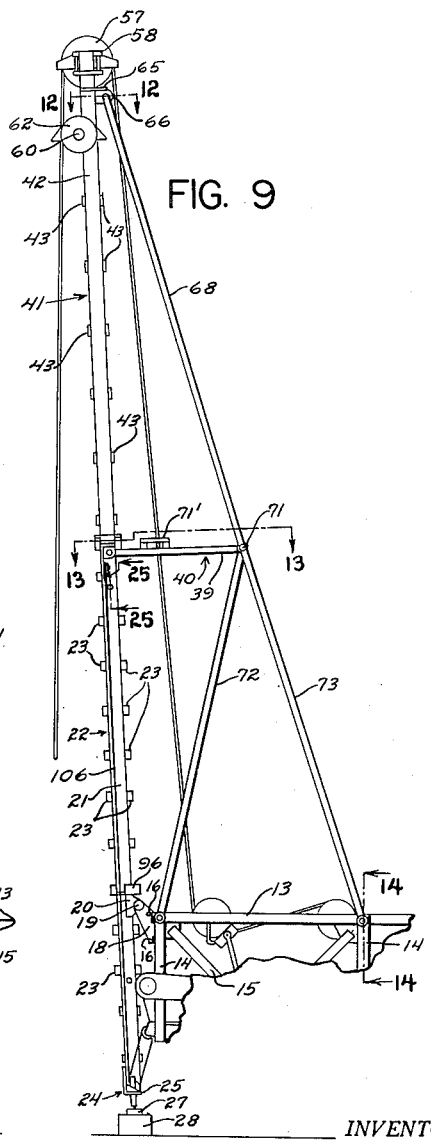
FIG. 8
FIG. 9
INVENTOR.
GEORGE HEINISH
BY
ATTORNEYS March 11, 1952 G. HEINISH 2,589,080
POWER-OPERATED TELESCOPING MAST AND BRACES
Filed Nov. 5, 1949 9 Sheets-Sheet 4
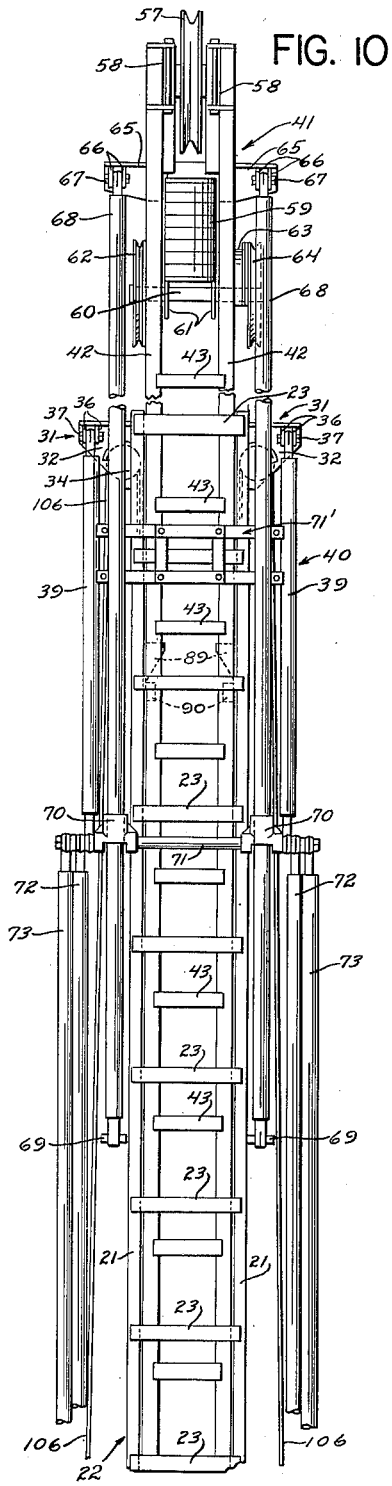
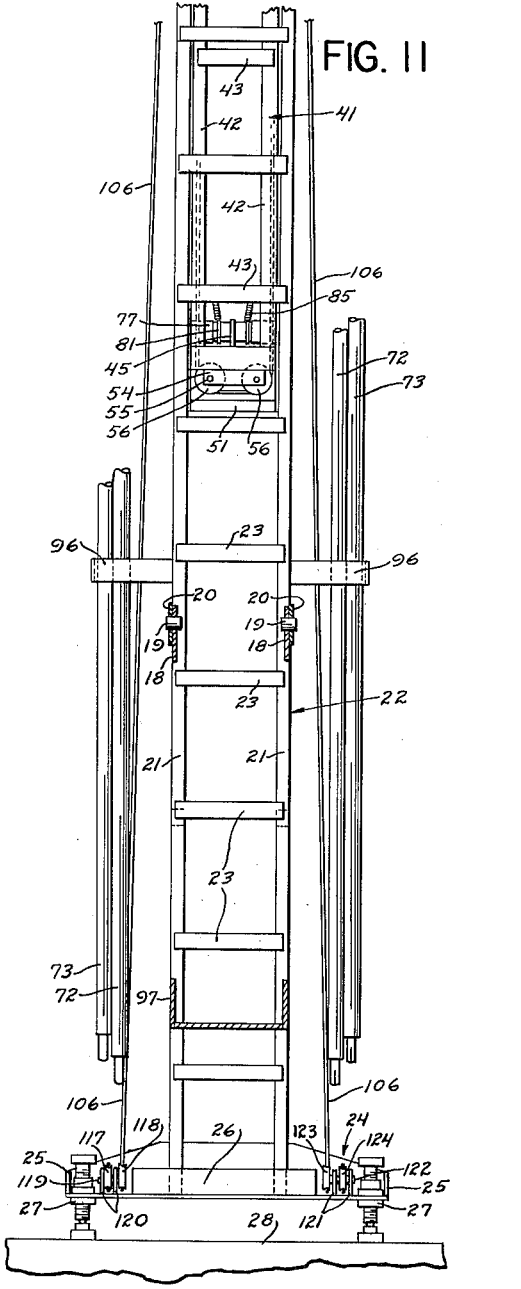
*INVENTOR.*
GEORGE HEINISH
BY
ATTORNEYS

March 11, 1952 — G. HEINISH — 2,589,080
POWER-OPERATED TELESCOPING MAST AND BRACES
Filed Nov. 5, 1949 — 9 Sheets-Sheet 5
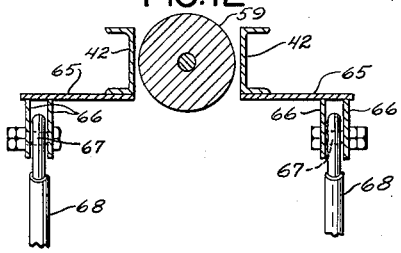
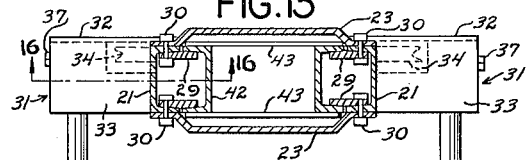
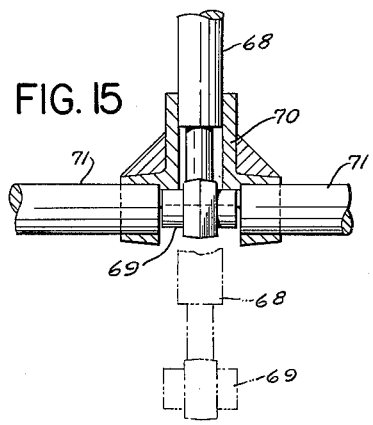
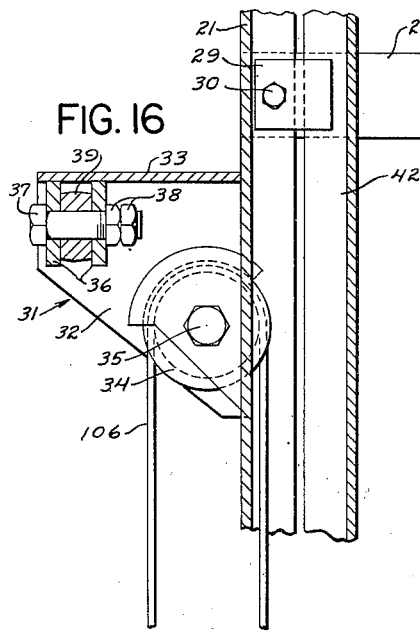
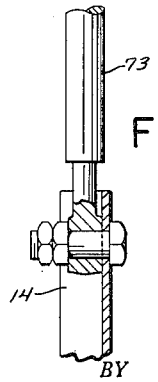
INVENTOR.
GEORGE HEINISH
BY
ATTORNEYS March 11, 1952 G. HEINISH 2,589,080
POWER-OPERATED TELESCOPING MAST AND BRACES
Filed Nov. 5, 1949 9 Sheets-Sheet 6

INVENTOR.
GEORGE HEINISH
BY Ely & Frye
ATTORNEYS

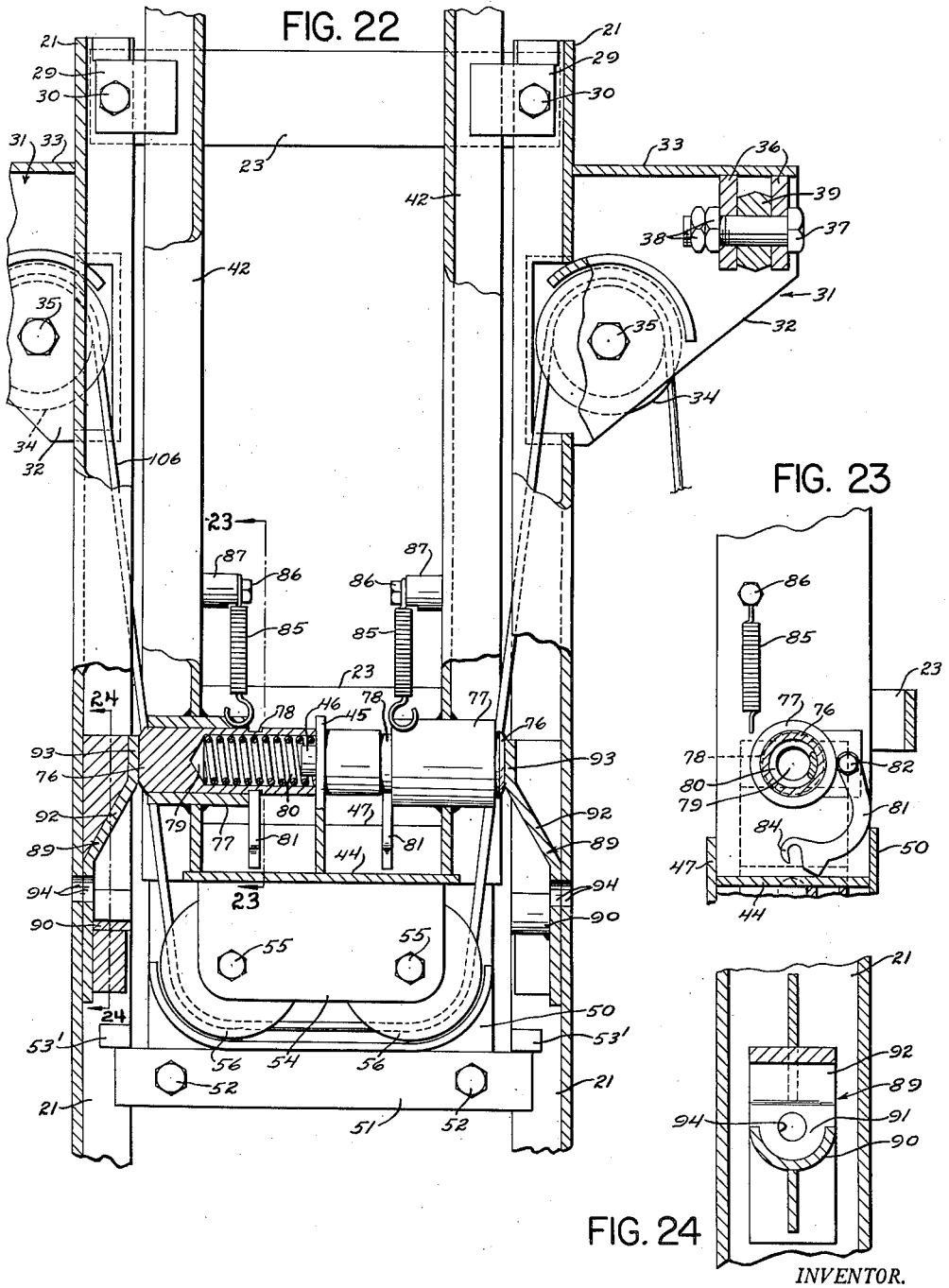

March 11, 1952 G. HEINISH 2,589,080
POWER-OPERATED TELESCOPING MAST AND BRACES
Filed Nov. 5, 1949 9 Sheets-Sheet 8

INVENTOR.
GEORGE HEINISH
BY Ely & Frye
ATTORNEYS

March 11, 1952 — G. HEINISH — 2,589,080
POWER-OPERATED TELESCOPING MAST AND BRACES
Filed Nov. 5, 1949 — 9 Sheets-Sheet 9

INVENTOR.
GEORGE HEINISH
BY Ely & Frye
ATTORNEYS

Patented Mar. 11, 1952

2,589,080

UNITED STATES PATENT OFFICE 2,589,080

POWER-OPERATED TELESCOPING MAST AND BRACES

George Heinish, Akron, Ohio, assignor to The Star Drilling Machine Company, Akron, Ohio, a corporation of Ohio Application November 5, 1949, Serial No. 125,684

41 Claims. (Cl. 189—14)

This invention relates to improvements in well drilling machines, more particularly machines of the portable type, and it specifically relates to improvements in the construction and operation of the power operated masts and braces used with such machines.

In conventional portable drilling machines in use today, when the mast is formed with upper and lower telescoping sections which are supported in upright position by suitable braces, all of these sections and braces are pivoted to move to a substantially horizontal position on top of a vehicle for transportation purposes. These braces comprise a pair of spaced, inclined upper members, pivoted at their upper ends to the upper portion of the upper mast section, and pivoted at their lower ends to the rear end portion of a horizontal bracing member. (In this art the front of the drilling machine is at the rear end of the vehicle and is to be so considered throughout this case.) This horizontal bracing member is substantially rectangular in shape and includes a pair of spaced, longitudinal side arms that have their front ends secured to the lower mast section adjacent the upper end of the latter section. Two pairs of spaced, inclined lower brace members are pivoted at their upper ends to the rear end portion of the horizontal bracing member, and are secured at their lower ends to the frame of the drilling machine. Each pair of lower braces inclines oppositely to the other pair, with one pair being secured near the rear of the machine frame and the other being secured near the front of such frame.

When these conventional mast sections and braces are in their horizontal position on a vehicle, the mast sections are fully telescoped and locked together by a bolt extending through them, the lower ends of each pair of lower braces are disconnected from the machine frame, and the front ends of the side arms of the horizontal bracing member are disconnected from the lower mast section. When it is desired to raise the mast and braces to proper position for drilling, the mast sections in telescoped position are mechanically tilted to substantially vertical position, the locking bolt is removed, and the upper mast section is then moved upwardly by suitable means. Since the upper ends of the inclined upper braces are pivoted to the upper mast section, such braces will also be raised, and since the rear end portion of the horizontal bracing member is pivoted to both the upper and lower inclined braces, the latter as well as the horizontal member will also be raised. It then becomes necessary for a workman to climb up the lower mast section on ladder rungs provided for that purpose and lock the mast sections together in extended position and then secure the front ends of the horizontal side arms to the lower mast section. Due to the weight of the horizontal bracing member and the bracing arms pivoted thereto, assistance by another workman pulling these braces away from the mast is usually required. Of course, the lower ends of the lower pairs of braces must also be secured to the machine frame. To return the mast and braces to their lowered position on the vehicle it is necessary to first disconnect the lower ends of the lower bracing members from the machine frame. Then a workman must climb the mast, disconnect the horizontal side arms from the mast, and remove the bolt locking the mast sections together, in their extended position, after which the mast and braces may be lowered.

The reason why it is necessary to disconnect the horizontal bracing member from the lower mast section in conventional machines during raising and lowering of the upper section is because the extent of movement of the upper mast section from telescoped to raised position and vice versa is greater than the length of the horizontal bracing member, and if the latter were not disconnected the upper section could not complete its full movement. Experience has determined that it is more desirable to move the upper mast section a greater distance than the length of the horizontal bracing member, since limitations of transportation and working space require this greater movement of the upper section.

It long has been recognized that the job of connecting and disconnecting the horizontal side arms to and from the lower mast section is extremely dangerous for the workman who climbs the mast, and one of the objects of this invention is to eliminate this danger by permanently pivoting the horizontal side arms to the lower mast section so that the horizontal bracing member may readily be pivoted from its horizontal bracing position to a non-bracing position parallel to the mast and vice versa, during the lowering and raising of the upper mast section.

When the horizontal bracing member is permanently pivoted to the lower mast section as disclosed in the present invention, some means must be provided to compensate for the difference between the length of the horizontal bracing member and the distance traveled by the upper mast section in raising and lowering. This may be done by providing a slip-joint connection at either end of the horizontal bracing member. Accordingly, it is another object of this invention to provide a novel slip-joint connection either between the upper braces and the rear end of the horizontal bracing member, whereby the upper braces will automatically disconnect themselves from the horizontal member as the upper mast section is lowered and will automatically re-establish a proper connection when the upper mast section is again raised, or between the opposite end of the horizontal bracing member and the lower mast section, whereby this end of the horizontal bracing member will automatically move relatively of the lower mast section during movement of the upper mast section without being disconnected from the lower mast section.

A further object is to provide novel locking mechanism for automatically locking the upper mast section in its extended or fully raised relation with the lower mast section, and to utilize portions of this same mechanism together with additional means to manually lock the mast sections together in their telescoped relation. Thus, the necessity for having a workman climb the mast to lock the sections is obviated.

A further object is to automatically unlock the mast sections prior to lowering the upper mast section.

A further object is to provide novel power operated means for raising and lowering the mast sections and braces.

The overall objective of the invention is the raising and lowering of the mast and braces by a single operator who remains on the ground, except in one minor instance, and who through suitable power means completely controls the entire operation.

Other objects and advantages will become apparent from the following description taken in conjunction with the accompanying drawings.

In the drawings:

Fig. 1 is a side elevation of a portable drilling machine with its mast and braces in substantially horizontal position on a vehicle, ready for transportation.

Fig. 2 is an enlarged fragmentary section taken substantially on line 2—2 of Fig. 1, and turned approximately 90°, showing the cable drum and power take off for raising and lowering the mast and braces, Fig. 3 is a similar section taken substantially on line 3—3 of Fig. 1 and turned approximately 90° showing the sheave and cable arrangement on the front of the drilling machine, Fig. 4 is a side elevation of the telescoped mast sections in partially tilted position, Fig. 5 is a similar view with the mast sections in fully tilted position prior to elevating the upper mast section, Fig. 6 is a schematic view showing the arrangement of pulleys and cable for raising and lowering the mast and braces, Fig. 7 is a reduced side elevation of the mast sections fully tilted, with the upper mast section partially raised, Fig. 8 is a similar view with the upper mast section raised to a greater height, but not completely raised, and showing movement of the braces away from the mast, Fig. 9 is a similar view with both mast sections in fully raised position, and with the braces in proper bracing position, Fig. 10 is an enlarged rear elevation of a portion of the mast sections and braces looking substantially in the direction indicated by the line 10—10 of Fig. 7, Fig. 11 is a similar view looking substantially in the direction indicated by line 11—11 of Fig. 7, Fig. 12 is an enlarged fragmentary section taken substantially on line 12—12 of Fig. 9, and turned approximately 90°, Fig. 13 is a similar section taken substantially on line 13—13 of Fig. 9, and turned approximately 90°, Fig. 14 is a similar section taken substantially on line 14—14 of Fig. 9, Fig. 15 is a fragmentary view partly in elevation and partly in section showing the slip-joint connection between the upper inclined brace members and the horizontal brace member, Fig. 16 is an enlarged section taken substantially on line 16—16 of Fig. 13, Fig. 17 is a similar section taken substantially on line 17—17 of Fig. 5, with the locking pins in locked position holding the upper mast section to the lower mast section in fully telescoped position.

Figure 18:
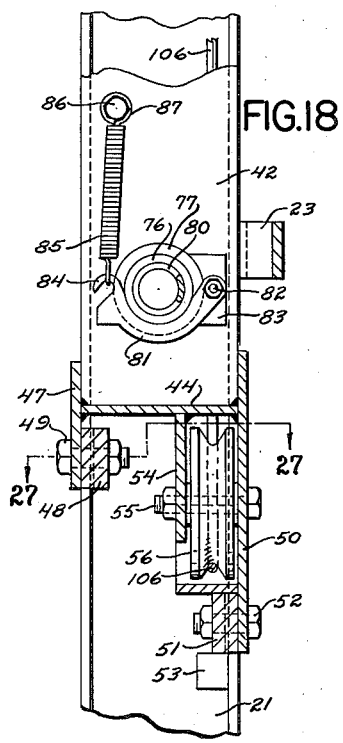
Figure 19:
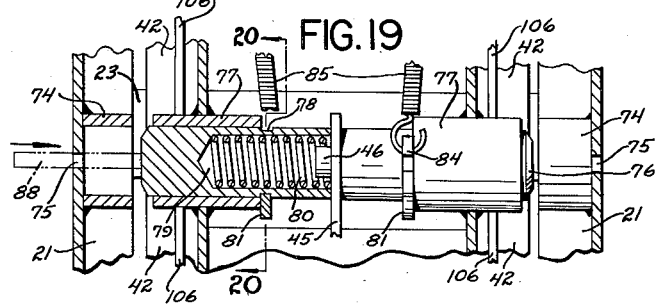
Figure 20:
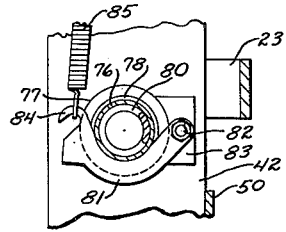
Figure 21:
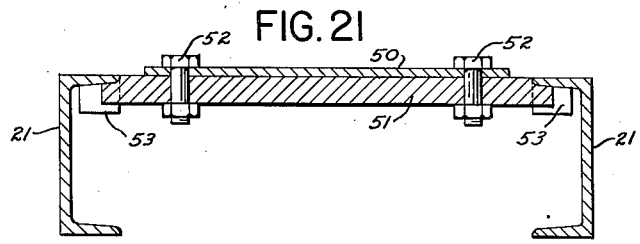
Figure 25:
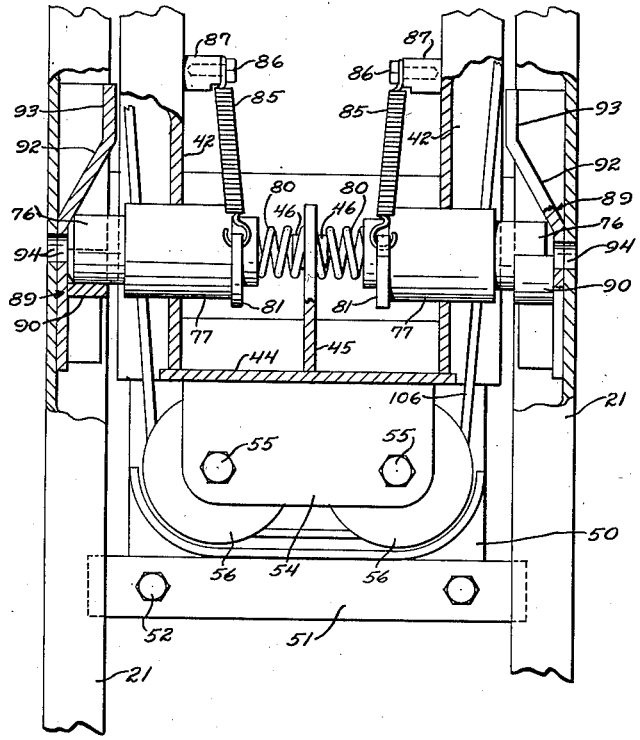
Figure 26:
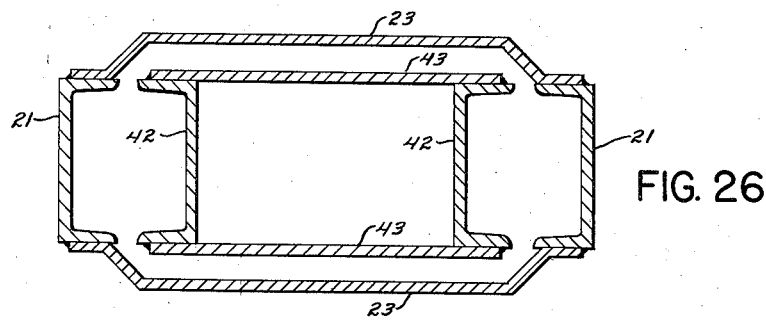
Figure 27:
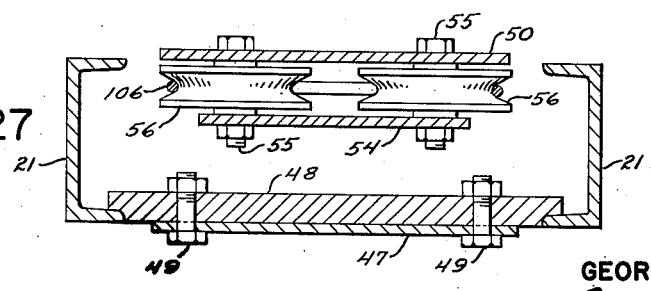
Figure 28:
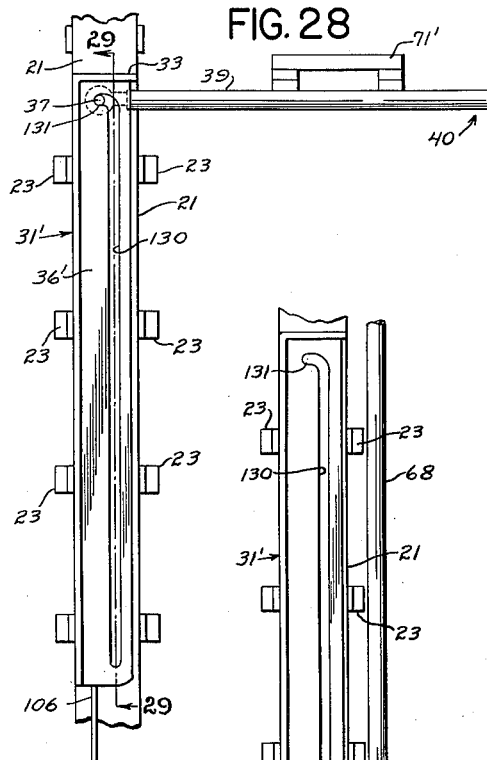
Figure 29:
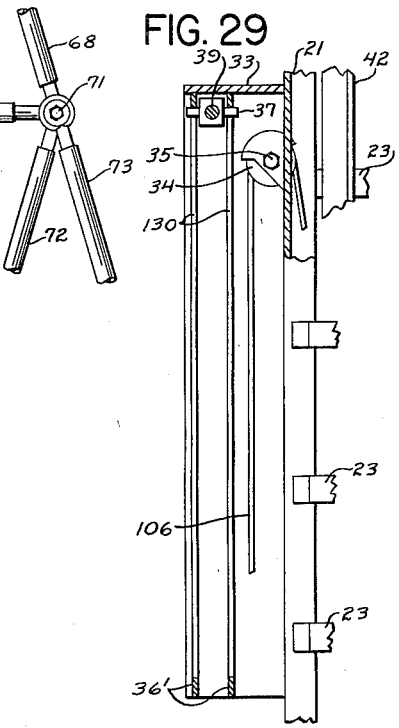
Figure 30:
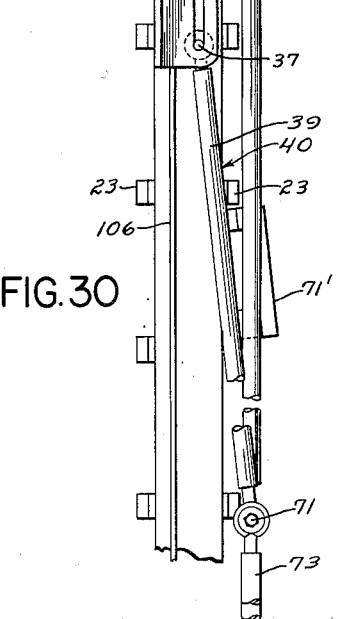
Figure 31:
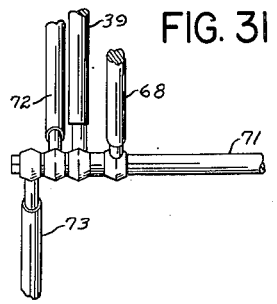

Fig. 18 is a similar section taken substantially on line 18—18 of Fig. 17,

Fig. 19 is a fragmentary section similar to a portion of Fig. 17, and showing the locking pins in unlocked position, Fig. 20 is a similar fragmentary section taken substantially on line 20—20 of Fig. 19, Fig. 21 is a section taken substantially on line 21—21 of Fig. 17, Fig. 22 is a fragmentary view partly in elevation and partly in section showing the upper mast section just prior to being locked by the locking pins to the lower mast section in the fully raised position of the mast sections, Fig. 23 is a fragmentary section taken substantially on line 23—23 of Fig. 22, Fig. 24 is a similar section taken substantially on line 24—24 of Fig. 22, Fig. 25 is a view similar to a portion of Fig. 22, with the locking pins locking the mast sections together in their fully raised position, Fig. 26 is an enlarged section taken substantially on line 26—26 of Fig. 5, and turned approximately 90°, Fig. 27 is a section taken substantially on line 27—27 of Fig. 18, and turned approximately 90°, Fig. 28 is an enlarged fragmentary view showing a modified form of slip-joint connection between the horizontal bracing member and the lower mast section, Fig. 29 is a section taken substantially on line 29—29 of Fig. 28, Fig. 30 is a view similar to Fig. 28 with the horizontal bracing member in its lowered position, and Fig. 31 is a fragmentary view showing a non-slipping connection between the upper braces and the horizontal bracing member when the modified form of slip-joint as shown in Figs. 28–30, is used.

Referring to the drawings the numeral 10 designates a vehicle, in this instance a truck, the frame 11 of which supports in the customary manner a complete drilling machine. The frame 11 also carries a drilling machine frame comprising lower horizontal beams 12, upper horizontal beams 13, vertical beams 14, diagonal braces 15, and transverse beams 16. The frame may also include other beams as needed.

The rear portion of the machine frame carries a power plant 17, in this instance an internal combustion engine, which is used to furnish power for operating the various mechanisms needed to drill a well, and for raising and lowering the mast sections and braces. Since this invention relates primarily to the construction and operation of the mast and braces, I will not describe in detail the other mechanisms which make up a drilling machine as they are well known to those familiar with this art.

Suitably secured to the transverse frame beams 16 is a pair of spaced bracket arms 18, the upper ends of which carry trunnions 19, each of which receives the outer portion of a bracket 20 suitably fastened to the spaced legs 21 of the lower mast section that is indicated as a whole by the numeral 22. The arrangement is such that the lower mast section 22 is pivotally mounted intermediate its ends substantially centrally of the width of the vehicle 10 and may be pivoted around the trunnions 19 from the horizontal position shown in Fig. 1 to a position slightly past vertical as shown in Figs. 5, 7, 8, and 9, and vice versa.

As more clearly shown in Fig. 26, the legs 21 of the lower mast section comprise channel members, the open portions of which face each other, and these legs are held in predetermined spaced relation by a plurality of spaced oppositely disposed rungs 23, or the like, welded or otherwise suitably secured to these legs. Rungs 23 are formed with outwardly bent portions intermediate their ends so that the upper mast section, to be later referred to, can move freely into and out of telescoped position inwardly of the lower mast section without interference from these rungs. This arrangement not only provides a strongly constructed lower mast section, but also provides a ladder-like means for permitting workmen to climb up and down the mast sections whenever necessary.

The lower ends of legs 21 are welded or otherwise suitably secured to an elongated transverse base member, indicated as a whole by the numeral 24, which member is generally of L-shape in cross-section with gusset plates 25 at the ends thereof, and which carries a supplemental leg securing portion 26 (Fig. 11), to which the lower ends of legs 21 may also be welded. Adjacent its ends, base member 24 also carries adjustable leveling devices 27 which may be used in conjunction with ground supports 28 to properly level the mast in its upright position.

As more clearly shown in Figs. 13, 16 and 22, legs 21 adjacent their upper ends each carry a pair of spaced longitudinal guide members 29 which may be secured to the legs and to the uppermost pair of rungs 23 by means of bolts and nuts 30, or the like. These guide members 29 are utilized to guide the upper mast section into and out of telescoped relation with the lower mast section as will be referred to later. Just below the uppermost pair of rungs 23, each leg 21 has welded or otherwise suitably secured thereto, a bracket arm or plate 31 of generally L-shape in cross-section, having a relatively large portion 32 extending parallel with legs 21 and a smaller portion 33 extending at a right angle to portion 32. Each portion 32 carries a small sheave 34 rotatable on a pin 35 suitably secured to plate 31, and each portion 33 carries a pair of spaced, integral ears 36 which receive a pivot pin or bolt 37 having nuts 38 thereon, each pin 37 permanently pivotally receiving the reduced inner end portions of side arms 39 of a horizontal bracing member, indicated as a whole by the numeral 40.

The upper mast section is indicated as a whole by the numeral 41 and comprises spaced legs 42 joined by a plurality of oppositely disposed rungs 43 welded or otherwise suitably secured thereto (see Fig. 26). Legs 42 are also of channel shape in cross-section with the channels facing away from each other, the arrangement being such that mast section 41 is slidable within mast section 22, with legs 42 passing outwardly of and in engagement with guide members 29 (Fig. 13), which members guide the mast section 41 in its sliding movement. The structure provides a strong upper mast section with a ladder-like means to permit workmen to climb to the top of the mast if necessary.

As more clearly shown in Figs. 17, 18, 22 and 25, the lower ends of legs 42 are connected by a transverse plate 44 which preferably is welded thereto, and which has welded on its upper surface a central partition 45 extending parallel with legs 42. Partition 45 carries adjacent its free end, a cylindrical transverse projection 46 that extends a short distance on each side of this partition. Welded to the rear edge of plate 44 and to the adjacent portion of leg 42, is a small depending plate 47 (see Figs. 18 and 27) the lower portion of which carries a transverse guide bar 48 secured thereto by bolts 49, which bar extends into the channels of legs 21 as indicated in Fig. 27, when the mast sections are in telescoped relation. Welded to the front edge of plate 44 and to the adjacent portion of leg 42, is a relatively large depending plate 50, the lower end of which also carries a guide and limiting bar 51 (Figs. 17, 18 and 21) secured thereto by bolts 52, which bar also extends into the channels of legs 21 as indicated in Fig. 21 when the mast sections are in telescoped relation. Bar 51 in addition to its function as a guide also limits the extent of downward movement of the upper mast section by contact with the stop lugs 53 welded or otherwise suitably secured in the channels of legs 21, as indicated in Figs. 17, 18, and 21. When bar 51 engages lugs 53 the mast sections are in fully telescoped position. Welded to the lower surface of plate 44 and arranged intermediate plates 47 and 50 is another plate 54, which latter plate, together with plate 50 supports a pair of pins or bolts 55 upon each of which a sheave 56 is rotatably mounted. The lower portion of partition 45 may also be welded to the upper portion of plates 47 and 50, if desired.

The structure associated with the upper end portion of the upper mast section 41 may be conventional and includes the usual crown sheave 57 rotatably supported in bearings 58 suitably secured to legs 42, and the customary shock absorber 59 (Fig. 10) may be utilized to cushion shock transmitted through the drill line to the crown sheave. At a suitable distance below the crown sheave, a shaft 60 is journaled in bearings 61 secured to and arranged inwardly of legs 42, and this shaft rotatably carries sheaves 62, 63, and 64 which receive the other lines leading from the reels on the machine in the usual manner. Just below the crown sheave 57, each leg 42 has a laterally extending bracket or plate 65 of L-shape in crosssection welded or otherwise suitably secured thereto, and each bracket 65 carries a pair of spaced ears 66 which receive a pivot pin or the like 67, each pin 67 permanently pivotally receiving the reduced outer end portions of upper bracing arms or members 68.

As will be more clearly observed from Figs. 7, 10 and 15, the opposite end 69 of each bracing member 68 is of T-shape, and each member 68 extends slidably through a sleeve 70 of substantially T-shape in cross-section, which sleeves are welded to or otherwise formed integral with a cross arm 71 (Figs. 13 and 15) to which the outer ends of arms 39 are pivotally connected outwardly of said sleeves. The arrangement is such that side arms 39 and cross arm 71 comprise the substantially rectangular bracing member 40 which has been termed the horizontal bracing member because it occupies a substantially horizontal position when the upper mast section is fully raised to drilling position, as shown in Fig. 9. A conventional drilling tool cable guide 71' may be secured between side arms 39 in the usual manner. Also, the sleeves 70 permit a slip joint connection between the bracing member 40 and the bracing arms 68, which is provided to eliminate the necessity of connecting arms 39 to the lower mast section after the upper mast section has been fully raised and of disconnecting arms 39 from the lower mast section when the upper mast section is to be lowered. Thus, when the upper mast section is lowered to fully telescoped position, the arms 68 merely slide through the sleeves 70, as indicated in Figs. 7, 10 and 15, while arms 39 remain pivoted to the upper mast section. When raising the upper mast section from its position in Fig. 7, arms 68 will slide through sleeves 70 until the T-shape ends 69 engage these sleeves as indicated in Fig. 15, after which engagement the bracing member 40 will be raised as indicated in Fig. 8 until it reaches its horizontal position in Fig. 9. Hence, this slip-joint arrangement makes it unnecessary for a womkman to climb the mast to connect and disconnect the horizontal bracing member to and from the lower mast section.

Outwardly of arms 39, arm 71 pivotally receives one end of a pair of lower bracing arms 72, the opposite ends of which are manually connected to and disconnected from the upper ends of the front frame beams 14 in the usual manner, while outwardly of arms 72, arm 71 also pivotally receives one end of a second pair of lower bracing arms 73, the opposite ends of which are manually connected to and disconnected from the upper ends of the rear frame beams 14 in the customary manner.

Novel means are provided for locking the upper mast section 41 in fully telescoped position within the lower mast section 22 so that these sections may be moved as a unit from the horizontal position on the truck in Fig. 1 to the substantially vertical position in Fig. 7, and vice versa. Also, the portion of this locking means which is carried by the upper mast section is again utilized to lock the latter section in fully raised position to the lower mast section.

Referring to Figs. 17 to 20 inclusive, each leg 21 has an inwardly extending annular socket member 74 welded or otherwise suitably secured in the channel thereof, with an opening 75 being provided to permit access to each socket member from outside of legs 21. Socket members 74 are located a predetermined distance from stop lugs 53 so that when bar 51 engages lugs 53 and prevents further downward movement of the upper mast section 41, sockets 74 will be in transverse alignment with locking pins 76 which are slidable in sleeves 77 fixedly secured in legs 42 as by welding or otherwise and extending inwardly of legs 42 as indicated in Figs. 17 and 19. Each pin 76 has a peripheral groove 78 intermediate its ends and is provided with a longitudinal bore 79 extending from its inner end, preferably for more than half its length. Each bore 79 receives a coil spring 80, one end of which bears against its cooperating pin 76, while the opposite end of each spring surrounds projection 46 and bears against partition 45. Springs 80 have a normal bias tending to force pins 76 outwardly and into the sockets 74, thus locking the two mast sections in telescoped relation.

In order to hold pins 76 out of locking position, which is necessary during raising and lowering of the upper mast section, a locking collar 81 is provided for each pin. In this instance each collar 81 is substantially semi-annular and of a size suitable to pass around the lower surface of its adjacent pin 76 and to fit into groove 78 under certain conditions (Figs. 18 and 20). One end of each collar 81 is pivoted as at 82 to a lug 83 welded or otherwise suitably secured to leg 42, while the opposite end of each collar terminates in a hook portion 84 adapted to be engaged under certain conditions by one end of a coil spring 85, the opposite end of which is secured to a bolt 86 threaded into a lug 87 which is welded or otherwise secured to leg 42. Springs 85 have a normal bias tending to hold collars 81 in contact with the locking pins 76 whenever these springs are in engagement with the hooks 84 of the collars (Figs. 17 to 20). When springs 85 are out of engagement with collars 81, the latter will either have dropped by gravity to the position indicated in Fig. 23, or they will be held in grooves 78 by the action of springs 80, as will be further explained.

Figs. 17 and 18 show the locking pins 76 in locking engagement with the sockets 74 and during such engagement it is immaterial whether or not springs 85 are connected to collars 81. However, before unlocking the mast sections to permit raising of the upper mast section, springs 85 are connected to hooks 84 and collars 81 are then held in engagement with the outer surface of pins 76 immediately outwardly of sleeves 77, which is the position shown in Figs. 17 and 18. The operator now takes a tool, such as the rod 88 (Fig. 19), and through openings 75 separately forces each pin 76 inwardly against the action of springs 80 until each groove 78 becomes aligned with its associated collar 81, at which time the latter will be forced into the groove 78 by the action of springs 85 to hold the pins 76 in unlocked position as in Fig. 19. After the collars 81 enter the grooves 78 further use of tool 88 is unnecessary and the action of springs 80 will then hold the collars in the grooves and against the inner ends of sleeves 77, even though springs 85 are thereafter disconnected from hooks 84. While the upper mast section may now be raised with the springs 85 connected to collars 81, it is desirable and necessary to disconnect these springs in order to obtain automatic locking of the mast sections together after the upper section has been fully raised, as will be more fully explained.

Referring now to Figs. 22 to 25 inclusive, at a predetermined distance from the top of the lower mast section, legs 21 each have a bracket, indicated as a whole by the numeral 89, welded or otherwise suitably secured in the channels thereof. Each bracket 89 comprises a socket member 90 open as at 81, and an inwardly inclined surface 92 terminating in an end portion 93 parallel with legs 21. Aligned openings 94 extend through the legs 21 and brackets 89 to permit access to the sockets 90 from outside the legs.

As the upper mast section is raised, with springs 85 disconnected from collars 81, pins 76 will be held in their inner position free of interference with any portion of the lower mast section until they reach approximately the position shown in Fig. 22. In the latter position they will have passed by the sockets 90 and into engagement with the upper portion of surfaces 92 and end portions 93 of brackets 89 which are intentionally located in the path of travel of pins 76. At the time pins 76 reach the position shown in Fig. 22, bar 51 will contact stop lugs 53', similar to lugs 53, and prevent further upward movement of section 41. As the pins 76 engage these upper portions of brackets 89, the pins are moved inwardly sufficiently to release the action of springs 80 on collars 81 and to permit these collars to drop by gravity out of the grooves 78 to the position shown in Figs. 22 and 23. After the upper mast section has reached its limit of upward movement and the collars 81 have dropped out of grooves 78, this mast section is then lowered. During this lowering movement, since pins 76 are no longer restrained by collars 81, these pins will move outwardly and down the inclined surfaces 92 until they come to rest in sockets 90, thus locking the two mast sections together and preventing further downward movement of the upper section as shown in Fig. 25. It will be observed that automatic means are thus provided for releasing the pins 76 from restraint by collars 81 and permitting these pins to move outwardly to locking position in sockets 90.

When the mast sections are locked together in raised position as in Fig. 25, the upper braces 68 and the horizontal bracing member 40 will be in the position shown in Fig. 9, and after the operator has manually connected the lower braces 72 and 73 to the machine frame, the mast will be ready to handle drilling operations.

When it is desired to lower the upper mast section, a workman first must climb the mast and connect springs 85 to the collars 81 so that the latter are held in contact with the surface of pins 76 outwardly of sleeves 77, as indicated in Fig. 25. This is the only time that it is necessary for a workman to climb the mast during either raising or lowering operations, and since the mast sections are still locked in their raised position, there is a minimum of danger to the workman. After the workman has left the mast, braces 72 and 73 are disconnected from the machine frame and the upper mast section, bracing member 40 and braces 68 are ready to be lowered.

To automatically unlock the mast sections prior to lowering the upper mast section, the latter is first moved upwardly causing pins 76 to engage inclined surfaces 92 and be forced inwardly thereby until grooves 78 are in alignment with collars 81, at which time springs 85 will force collars 81 into grooves 78, thus holding the pins 76 in their inner position free of engagement with the lower mast section during downward movement. The upper mast section may now be lowered until bar 51 engages stop lugs 53 at which time pins 76 will again be in alignment with sockets 74. A workman now disconnects springs 85 from collars 81, and again using a tool similar to tool 88 separately forces each pin 76 farther inwardly until collars 81 drop by gravity out of grooves 78, which action after removal of tool 88, allows springs 80 to force pins 76 into locking position in sockets 74. The mast sections are now locked together in telescoped relation and may be tilted as a unit to their horizontal position on the truck in Fig. 1. If desired, after pins 76 have been forced into sockets 74, the workman may again connect springs 85 to collars 81 so that the mast sections will be ready to be unlocked when they again are to be raised to drilling position.

In Figs. 1, 4, 5, 7, 8, 9, and 11, a pair of L-shaped, lateral supporting brackets 96 are shown as being carried by the lower mast section 22 intermediate the ends of the latter, which brackets are utilized to support the lower braces 72 and 73 in non-interfering position during such time as the free ends of these braces are disconnected from the machine frame. Usually these braces are manually moved to positions where they are engaged and held by the brackets 96 as soon as they are disconnected from the machine frame.

Also, an L-shaped bracket 97 (Figs. 1, 4 and 11) is carried by the lower mast section 22 near the bottom of the latter, and bracket 97 has an opening 98 therein, through which a bolt (not shown) extends for fastening the lower mast section more securely to the front of the machine frame (for example, to the front transverse plate 99) after the mast sections have been pivoted from their Fig. 1 position to the position shown in Figs. 5 and 7. Preferably this bolt is placed in proper position in the conventional manner to assist in supporting the mast sections in vertical position, prior to the raising of the upper mast section.

As will be more clearly noted from Figs. 1 and 2, a shaft 100 is mounted for rotation in bearing brackets 101, welded or otherwise suitably secured to the front frame beams 14 so that this shaft is carried forwardly of the machine frame and extends transversely thereof with portions of the shaft extending beyond the sides of the frame and carrying catheads 102 which may be utilized to carry certain of the conventional cable lines used during drilling operations. Adjacent one end of shaft 100 and outwardly of the machine frame, a sprocket wheel 103 is fixed to the shaft, which sprocket is engaged by a drive chain 104 that is connected to conventional mechanism operated from the engine 17 so that shaft 100 may be rotated by this engine when desired. It will be understood, of course, that such mechanism will also include a conventional clutch and brake (not shown) under manual control of the operator, the clutch being used when a driving engagement is desired and the brake being used when it is desired to snub rotation of the shaft.

Inwardly of the sprocket wheel 103, shaft 100 carries a reel 105 which it utilized to carry the power cable 106 that is employed to tilt the mast sections from their Fig. 1 position to their Fig 7 position, then to raise and lower the upper mast section, and then to return the mast sections to their Fig. 1 position. Preferably reel 105 is mounted for rotation with shaft 100, being secured by a plurality of bolts 107 to the peripheral flange of 108 of a collar 109 that is welded or otherwise rigidly secured to shaft 100.

As more clearly shown in Figs. 1, 2 and 3, shaft 100 is located just above front plate 99 of the machine frame, and below reel 105 in alignment therewith, plate 99 carries a pair of spaced sheaves 110 and 111 freely rotatable on a shaft 112. As shown, shaft 112 is fixed in spaced bearing brackets 113 welded to plate 99. Adjacent the opposite end of plate 99 another pair of spaced bearing brackets 114 are welded thereto, and these brackets carry a shaft 115 on which a sheave 116 is freely rotatable.

Referring to Fig. 11, it will be noted that adjacent one end, the base member 24 of the lower mast section carries a pair of spaced sheaves 117 and 118 which are freely rotatable on a shaft 119 which is fixed in spaced bearing brackets 120 suitably secured to the base member. Likewise, adjacent the other end of the base member a pair of spaced bearing brackets 121 are suitably secured thereto, which latter brackets carry a fixed shaft 122 on which a pair of spaced sheaves 123 and 124 are freely rotatable.

In order to more clearly demonstrate the operation of the power means including the cable 106, in Fig. 6 there is diagrammatically illustrated the location of the various sheaves with respect to each other, as well as with respect to reel 105 and the parts moved by operation of the cable 106. Thus, with one end of cable 106 secured to reel 105, the cable passes downwardly and under sheave 110 on plate 99, then around sheave 117 on base 24 and back to plate 99 where it passes around sheave 111. From the latter it goes back to base 24 and around sheave 118, from where it extends substantially longitudinally of the mast sections and around the left sheave 34 (as viewed in Fig. 6) near the upper end of the lower mast section. Then cable 106 extends under both sheaves 56 carried by the upper mast section 41, and then around the right sheave 34, from where it parallels the mast sections and passes under sheave 123 on base 24. From the latter it goes over again to plate 99 where it passes around sheave 116, from which it goes back to base 24 and around sheave 124, after which it returns to plate 99 and has its opposite end anchored to this plate at 125. Conventional cable guards have been shown in conjunction with certain of the sheaves, and it will be understood that similar guards may be utilized with any of the sheaves where it is necessary to have aid in keeping the cable in proper engagement with a particular sheave.

Assuming now that the mast sections are in their horizontal position shown in Fig. 1 with the cable 106 extending from reel 105 around the sheaves described to its anchoring point and it is desired to raise the sections in order to begin drilling operations. It will be recalled that at this time the mast sections are locked together in telescoped relation. The operator will start engine 17 and establish a driving connection to shaft 100 so as to rotate reel 105. As soon as reel 105 begins to rotate, the cable 106 will start to wind around this reel, and since the mast sections are locked together there can be no relative movement between these sections with respect to each other even though the cable is in engagement with sheaves 34 and 56. Thus, as the cable is wound around the reel and its effective length is shortened, the pivotally mounted lower mast section carrying the upper mast section with it will be moved about is pivot points, as indicated in Fig. 4, until it reaches the upright position shown in Figs. 5 and 7. The latter position is referred to as the vertical position, but actually the upright position is slightly beyond a true vertical position, as indicated in Figs. 5, 7, 8 and 9. At this time rotation of shaft 100 is stopped long enough for the operator to connect the supporting bolt between bracket 97 and plate 99, and to unlock the locking pins 76 as previously described to permit upward movement of the upper mast section.

Now, continued rotation of shaft 100 will continue to shorten the effective length of cable 106 and the upper mast section will be moved upwardly, due to the cable passing under sheaves 56, until locking pins 76 strike the upper portions of brackets 89 which automatically removes the restraint of collars 81 on pins 76. At this time shaft 100 and reel 105 are rotated for a slight distance in the opposite direction to release enough cable to permit the upper mast section to drop by gravity the distance required to let pins 76 be forced by springs 80 into locking position in sockets 90. The mast sections are now firmly locked in their extended position and cannot be lowered until they are unlocked.

During the upward movement of the upper mast section the braces 68, 40, 72 and 73 have moved from their position in Fig. 7, through their intermediate position in Fig. 8, until they reach their Fig. 9 position, it having been necessary, of course, for a workman to manually connect the lower ends of braces 72 and 73 to the machine frame in order to reach their Fig. 9 position. At this time the mast is fully raised and braced so that drilling operations may begin.

When it is desired to return the mast sections to their Fig. 1 position, a workman climbs the lower mast section to hook springs 85 to collars 81 as previously explained, and after the workman returns to the ground, braces 72 and 73 are disconnected from the machine frame and moved behind the bracket arms 96. Now the reel 105 is rotated sufficiently to raise the upper mast section from its locked position in Fig. 25 until the pins 76 are moved inwardly by the action of the inclined surfaces 92 to positions where they are held in unlocked position by collars 81. The upper mast section is now ready to move downwardly, so the direction of rotation of reel 105 is reversed, but its rotation is restrained by brake action so that the mast section cannot drop too rapidly. Actually, the upper mast section is heavy enough to easily drop its entire distance by gravity unless it is restrained, so if the cable is slowly lengthened it will act to lower the mast section at a proper speed.

Downward movement of the upper mast section will continue until bar 51 engages the stop lugs 53, at which time the mast sections are locked together in telescoped relation as previously explained, and the bolt securing bracket 97 to plate 99 is removed. At this time the mast sections are manually moved clockwise, as viewed in Fig. 5, around their pivot points to just beyond a vertical position, so that the portion thereof above the pivot points will slowly move by gravity under restraint by cable 106 until the position in Fig. 1 is reached.

Referring now to Figs. 28 to 31 inclusive, I have shown a modified form of the slip-joint connection to be used with the horizontal bracing member 40. In this form of the invention, instead of having braces 68 secured to arm 71 so as to be slidable with respect thereto, braces 68 are conventionally pivoted to arm 71, as indicated in Fig. 31.

Also, in this form of the invention pivot pins 37 on the front end of arms 39, while still being permanently pivoted to the lower mast section, are slidable in slots 130 formed in elongated ears 36' welded or otherwise suitably secured to elongated brackets 31' carried by legs 21 of the lower mast section. As more clearly shown in Figs. 28 and 30, slots 130 extend generally parallel to the lower mast section and have an upper portion 131 offset at about a right angle, which portion 131 receives the pivot pins 37 when the horizontal bracing member is in its raised position as indicated in Fig. 28.

The length of slots 130 is predetermined to compensate for the difference between the length of the horizontal bracing member and the distance traveled by the upper mast section during raising and lowering. Stated differently, the slip-joint connection in the first form of the invention compensates for this difference by providing slippage between the rear end of the horizontal bracing member and the upper braces, while the slip-joint connection in the modified form compensates for this difference by providing slippage between the front end of the horizontal bracing member and the lower mast section.

When the upper mast section is in raised position, the horizontal bracing member will be in the position shown in Fig. 23 with pins 37 in portions 131 of slots 130. During downward movement of the upper mast section, pins 37 will move out of portions 131 and downwardly to the bottom of slots 130, thus moving the horizontal bracing member downwardly as indicated in Fig. 30. During upward movement of the upper mast section, the horizontal bracing member will return to its Fig. 28 position. It will be apparent that when the modified form of the invention is utilized, it still is unnecessary for a workman to climb the mast to connect and disconnect the front end of the horizontal bracing member to the lower mast section.

While I have illustrated and described the preferred embodiments of my invention it will be understood that the invention is not limited to such embodiments, and changes and modifications may be made therein without departing from the spirit of the invention or from the scope of the subjoined claims.

What is claimed is:

1. In a mast of the character described, the combination of lower and upper sections, said upper section being movable from a telescoped position within said lower section to an extended position constituting substantially a continuation of said lower section, force actuated means on said upper section for locking it to said lower section while in either of said positions, means on said lower section to receive said first named means when said upper section is in either of said positions, mechanism carried by said upper section and engageable with said first named means for holding the latter out of locking position against the action of said force during upward movement of said upper section, and members on said lower section arranged in the path of travel of said first named means to release said mechanism from engagement with said first named means whereby said force will automatically move said first named means into position to lock said upper section to said lower section when in said extended position.

2. In a mast of the character described, in combination, lower and upper sections, said upper section being movable from a telescoped position within said lower section to an extended position constituting substantially a continuation of said lower section, force actuated locking members carried by said upper section and movable relatively thereof for locking said upper section to said lower section in either of said positions, means carried by said lower section to receive and hold said locking members when said upper section is in either of said positions, mechanism carried by said upper section and engageable with said locking members for holding the latter out of locking position against the action of said force during upward movement of said upper section, and means carried by said lower section arranged in the path of travel of said locking members to release said mechanism for engagement with said locking members whereby said force will automatically move said locking members into position to lock said upper section to said lower section while in said extended position.

3. In a mast of the character described, the combination of inner and outer relatively movable telescoping sections, spring operated locking pins carried by said inner section and movable transversely relatively thereof for locking and unlocking said sections, each of said pins being provided with a peripheral groove in its outer surface, sockets carried by said outer section to receive and hold said locking pins when the sections are locked together, means carried by said inner section and engageable in said grooves for holding said locking pins out of locking position against the action of said springs during relative movement of said sections, and members carried by said outer section in the path of travel of and engageable with said pins during movement of said inner section with respect to said outer section to release said means from said grooves whereby to cause said pins to automatically move into said sockets to lock said sections together, said members also being operable thereafter to move said pins automatically from locked to unlocked position.

4. A mast of the character defined in claim 3 wherein said members comprise inwardly inclined surfaces arranged in the path of travel of said locking pins above said sockets.

5. In a drilling machine including a mast formed with lower and upper relatively movable telescoping sections, diagonal braces pivoted at their upper ends to said upper mast section adjacent the upper end thereof, a horizontal bracing member connected at one end to the lower ends of said diagonal braces and at its opposite end to said lower mast section adjacent the upper end of the latter, additional diagonal braces pivoted at their upper ends to the first named end of said horizontal bracing member and adapted to have their lower ends secured to a support, means providing for movement of said upper mast section relatively of said lower mast section, together with said horizontal bracing member and all of said diagonal braces without disconnecting said horizontal bracing member from said lower mast section, said means including a slip-joint in the said connection at one end of said horizontal bracing member, said means further including power mechanism for raising and lowering said upper mast section, said horizontal member and all of said diagonal braces as a unit.

6. A drilling machine of the character defined in claim 5 wherein means are provided to lock the mast sections together when the upper mast section is in lowered position, said power mechanism thereafter being operable to tilt said sections, said horizontal bracing member and all of said diagonal braces from a substantially vertical position to a substantially horizontal position and vice versa.

7. A drilling machine of the character defined in claim 5 wherein means are provided to automatically lock the mast sections together when the upper section is in its raised position.

8. A drilling machine of the character defined in claim 5 wherein said mast sections are locked together when the upper mast section is in its raised position, and means for automatically unlocking said sections when it is desired to lower said upper section.

9. In a drilling machine, in combination, a mast formed with lower and upper relatively movable telescoping sections, a horizontal bracing member pivoted at one end to said lower section adjacent the upper end thereof, diagonal braces pivoted at their upper ends to the opposite end of said horizontal bracing member and adapted to have their lower ends secured to a support, additional diagonal braces pivoted at their upper ends to said upper section adjacent the upper end thereof and having their lower ends secured to said opposite end of said horizontal bracing member with a slip-joint connection, and power means for raising and lowering said upper section, said horizontal bracing member and all of said diagonal braces without disconnecting the connections therebetween except to move said additional diagonal braces through said slip-joint.

10. A drilling machine of the character defined in claim 9 wherein means are provided to lock the mast sections together when the upper mast section is in lowered position, said power means thereafter being also utilized to tilt said sections, said horizontal bracing member and all of said diagonal braces from a substantially vertical position to a substantially horizontal position and vice versa.

11. A drilling machine of the character defined in claim 9 wherein means are provided to automatically lock the mast sections together when the upper mast section is in its raised position.

12. A drilling machine of the character defined in claim 9 wherein said mast sections are locked together when the upper mast section is in its raised position, and means for automatically unlocking said sections when it is desired to lower said upper section.

13. In a drilling machine, in combination, a mast formed with lower and upper relatively movable telescoping sections, diagonal braces pivoted at their upper ends to said upper mast section adjacent the upper end thereof, a horizontal bracing member pivoted at one end to the lower ends of said diagonal braces and having its opposite end secured with a slip-joint connection to said lower mast section adjacent the upper end of the latter, additional diagonal braces pivoted at their upper ends to the first named end of said horizontal bracing member and adapted to have their lower ends secured to a support, and power means for raising and lowering said upper section, said horizontal bracing member and all of said diagonal braces without disconnecting the connections therebetween except to move said horizontal bracing member through said slip-joint.

14. A drilling machine of the character defined in claim 13 wherein means are provided to lock the mast sections together when the upper mast section is in lowered position, said power means thereafter being also utilized to tilt said sections, said horizontal bracing member and all of said diagonal braces from a substantially vertical position to a substantially horizontal position and vice versa.

15. A drilling machine of the character defined in claim 13 wherein means are provided to automatically lock the mast sections together when the upper mast section is in its raised position.

16. A drilling machine of the character defined in claim 13 wherein said mast sections are locked together when the upper mast section is in its raised position, and means for automatically unlocking said sections when it is desired to lower said upper section.

17. In a drilling machine including a mast formed with lower and upper sections, said upper section being movable from a lowered position within said lower section to a raised position constituting substantially a continuation of said lower section and vice versa, diagonal braces pivoted at their upper ends to said upper mast section adjacent the upper end thereof, a horizontal bracing member connected at one end to the lower ends of said diagonal braces and at its opposite end to said lower mast section adjacent the upper end of the latter, means providing for raising and lowering of said upper mast section substantially vertically relatively of said lower mast section, together with said horizontal bracing member and said diagonal braces without disconnecting said horizontal bracing member from said lower mast section, said means including a slip-joint in the said connections at one end of said horizontal bracing member, and means for locking said sections together when the upper section is in raised or lowered position.

18. A drilling machine of the character defined in claim 17 wherein the means for locking the sections together when the upper section is in raised position includes mechanism operable automatically to lock said sections together.

19. A drilling machine of the character defined in claim 17 wherein after the sections are locked together with the upper section in raised position, means are provided for automatically unlocking the sections when the upper section is to be lowered.

20. In a drilling machine including a mast formed with lower and upper substantially vertically relatively movable telescoping sections, diagonal braces pivoted at their upper ends to said upper mast section adjacent the upper end thereof, a horizontal bracing member pivotally connected at one end to the lower ends of said diagonal braces and pivotally connected at its other end to said lower mast section adjacent the upper end of the latter, additional diagonal braces pivoted at their upper ends to the first named end of said horizontal bracing member and adapted to have their lower ends secured to a support, means providing for movement of said upper mast section vertically relatively of said lower mast section, together with said horizontal bracing member and all of said diagonal braces without disconnecting said horizontal bracing member from said lower mast section, said means including a slip-joint in the said connections at one end of said horizontal bracing member.

21. A drilling machine of the character defined in claim 20 wherein said slip-joint is located in the connections between said horizontal bracing member and said first named diagonal braces.

22. A drilling machine of the character defined in claim 20 wherein said slip-joint is located in the connections between said horizontal bracing member and said lower mast section.

23. A drilling machine of the character defined in claim 20 wherein said slip-joint is located in the connections between said horizontal bracing member and said first named diagonal braces, and wherein said slip-joint comprises a pair of generally T-shaped sleeves carried by said horizontal bracing member, the lower ends of said first named diagonal braces being formed generally of T-shape so as to be engaged in said sleeves when said upper mast section is in raised position and to be movable out of said sleeves during downward movement of said upper mast section.

24. A drilling machine of the character defined in claim 20 wherein said slip-joint is located in the connections between said horizontal bracing member and said lower mast section, and wherein said slip-joint comprises longitudinally slotted brackets carried by and arranged parallel to said lower mast section, said second named end of said horizontal bracing member being slidably received in the slots in said brackets so as to slide therein during relative movement of upper mast section with respect to said lower mast section.

25. In a drilling machine including a mast formed with lower and upper sections with the upper section being movable substantially vertically from a telescoped position within said lower section to an extended position constituting substantially a continuation of said lower section and vice versa, diagonal braces pivoted at their upper ends to said upper mast section adjacent the upper end thereof, a horizontal bracing member pivotally connected at its outer end to the lower ends of said diagonal braces and pivotally connected at its inner end to said lower mast section adjacent the upper end of the latter, said horizontal bracing member being shorter in length than the distance traveled by said upper mast section during its said movement, additional diagonal braces pivoted at their upper ends to the outer end of said horizontal bracing member and adapted to have their lower ends secured to a support, means providing for movement of said upper mast section relatively of said lower mast section, together with said horizontal bracing member and all of said diagonal braces without disconnecting said horizontal bracing member from said lower mast section, with the movement of said upper mast section being for a greater distance than the length of said horizontal bracing member, said means including a slip-joint in said connections at one end of said horizontal bracing member.

26. A drilling machine of the character defined in claim 25 wherein said slip-joint is located in the connections between said horizontal bracing member and said first named diagonal braces.

27. A drilling machine of the character defined in claim 25 wherein said slip-joint is located in the connections between said horizontal bracing member and said lower mast section.

28. A drilling machine of the character defined in claim 25 wherein said slip-joint is located in the connections between said horizontal bracing member and said first named diagonal braces, and wherein said slip-joint comprises a pair of generally T-shaped sleeves carried by said horizontal bracing member, the lower ends of said first named diagonal braces being formed generally of T-shape so as to be engaged in said sleeves when said upper mast section is in extended position and to be movable out of said sleeves during downward movement of said upper mast section.

29. A drilling machine of the character defined in claim 25 wherein said slip-joint is located in the connections between said horizontal bracing member and said lower mast section, and wherein said slip-joint comprises longitudinally slotted brackets carried by and arranged parallel to said lower mast section, and said inner end of said horizontal bracing member being slidably received in the slots in said bracket so as to slide therein during vertical movement of said upper mast section.

30. In a mast of the character described, in combination, lower and upper sections, said upper section being movable from a telescoped position within said lower section to an extended position constituting substantially a continuation of said lower section, spring operated locking pins carried by said upper section and movable transversely relatively thereof from a position locking said sections together to an unlocked position allowing movement of said upper section and vice versa, each of said pins being provided with a peripheral groove in its outer surface, lower and upper sockets carried by said lower section to receive and hold said locking pins in locking position in either the telescoped or the extended positions respectively of said sections, means carried by said upper section and engageable in said grooves for holding said locking pins out of locking position against the action of said springs during upward movement of said upper section, and means carried by said lower section in the path of travel of said pins during upward movement of said upper section to release said first named means from said grooves whereby said springs will automatically move said pins into said upper sockets to lock said sections together in extended position.

31. A mast of the character defined in claim 30 wherein said first named means comprises pivoted collars operable in said grooves and which collars move by gravity out of said grooves upon release by said second named means.

32. A mast of the character defined in claim 30 wherein said first named means comprises pivoted collars operable in said grooves and which collars move by gravity out of said grooves upon release by said second named means, and wherein said second named means comprises inwardly inclined surfaces arranged in the path of travel of said pins above said upper socket.

33. In a mast of the character described, the combination of inner and outer relatively movable telescoping sections, spring operated locking pins carried by said inner section and movable transversely relatively thereof from a position locking said sections together to an unlocked position allowing relative movement of said sections and vice versa, each of said pins being provided with a peripheral groove in its outer surface, sockets carried by said outer section to receive and hold said locking pins in locking position, means carried by said inner section and engageable in said grooves for holding said locking pins out of locking position against the action of said springs during relative movement of said sections, and means carried by said outer section in the path of travel of said pins during relative movement of said sections to release said first named means from said grooves whereby said springs will automatically move said pins into said sockets to lock said sections together.

34. A mast of the character defined in claim 33 wherein said first named means comprises pivoted collars operable in said grooves and which collars move by gravity out of said grooves upon release by said second named means.

35. A mast of the character defined in claim 33 wherein said first named means comprises pivoted collars operable in said grooves and which collars move by gravity out of said grooves upon release by said second named means, and wherein said second named means comprises inwardly inclined surfaces arranged in the path of travel of said pins above said sockets.

36. In a mast of the character described, the combination of inner and outer relatively movable telescoping sections, spring operated locking pins carried by said inner section and movable transversely relatively thereof from a position locking said sections together to an unlocked position allowing relative movement of said sections and vice versa, each of said pins being provided with a peripheral groove in its outer surface, sockets carried by said outer section to receive and hold said locking pins in locking position, means carried by said inner section and engageable in said grooves for holding said locking pins out of locking position during relative movement of said sections, and means carried by said outer section in the path of travel of said pins during relative movement of said sections to move said pins automatically into positions where they are held by said first named means out of locking position.

37. A mast of the character defined in claim 36 wherein said first named means comprises spring actuated pivoted collars movable into said grooves when said pins are moved by said second named means.

38. A mast of the character defined in claim 36 wherein said first named means comprises spring actuated pivoted collars movable in said grooves when said pins are moved by said second named means, and wherein said second named means comprises inwardly inclined surfaces arranged in the path of travel of said pins above said sockets.

39. In a mast of the character described, in combination, lower and upper sections, said upper section being movable from a telescoped position within said lower section to an extended position constituting substantially a continuation of said lower section and vice versa, spring operated locking pins carried by said upper section and movable transversely thereof from a position locking said sections together to an unlocked position allowing movement of said upper section and vice versa, each of said pins being provided with a peripheral groove in its outer surface, lower and upper sockets carried by said lower section to receive and hold said locking pins in locking position in either the telescoped or the extended positions respectively of said sections, means carried by said inner section and engageable in said grooves for holding said locking pins out of locking position during downward movement of said upper section from its extended to its telescoped position, and means carried by said lower section above said upper sockets whereby upon slight upward movement of said upper section beyond its extended position engagement of said pins with said last named means will move said pins automatically into positions where they are held by said first named means out of locking position during subsequent downward movement of said upper section.

40. A mast of the character defined in claim 39 wherein said first named means comprises spring actuated pivoted collars movable into said grooves when said pins are moved by said second named means.

41. A mast of the character defined in claim 39 wherein said first named means comprises spring actuated pivoted collars movable into said grooves when said pins are moved by said second named means, and wherein said second named means comprises inwardly inclined surfaces arranged in the path of travel of said pins.

GEORGE HEINISH.

REFERENCES CITED

The following references are of record in the file of this patent:

UNITED STATES PATENTS

| Number | Name | Date |
| --- | --- | --- |
| 2,204,713 | White, Jr. | June 18, 1940 |
| 2,331,559 | McEwen | Oct. 12, 1943 |
| 2,354,922 | McEwen et al. | Aug. 1, 1944 |